(12) United States Patent
Tölle et al.

(10) Patent No.: US 8,979,354 B2
(45) Date of Patent: Mar. 17, 2015

(54) MIXING MACHINE

(75) Inventors: Ulrich Tölle, Detmold (DE); Wolfgang Rüberg, Menden (DE); Matthias Herfeld, Iserlohn (DE)

(73) Assignee: Dr. Herfeld GmbH & Co. KG, Neuenrade (DE)

( * ) Notice: Subject to any disclaimer, the term of this patent is extended or adjusted under 35 U.S.C. 154(b) by 769 days.

(21) Appl. No.: 12/788,193

(22) Filed: May 26, 2010

(65) Prior Publication Data

US 2010/0302898 A1    Dec. 2, 2010

(30) Foreign Application Priority Data

May 26, 2009    (DE) .................... 20 2009 004 866 U

(51) Int. Cl.
*B01F 15/06*   (2006.01)
*B01F 3/18*    (2006.01)
(Continued)

(52) U.S. Cl.
CPC ... *B01F 3/18* (2013.01); *B01F 3/20* (2013.01); *B01F 3/2078* (2013.01); *B01F 9/06* (2013.01); *B01F 15/065* (2013.01); *B29B 7/50* (2013.01); *F28D 7/106* (2013.01); *F28D 11/02* (2013.01); *F28F 1/02* (2013.01); *B01F 2009/0092* (2013.01); *B01F 2015/061* (2013.01); *B01F 2215/0049* (2013.01); *F28F 2215/06* (2013.01); *F28D 2021/0045* (2013.01); *F28D 2021/0052* (2013.01)
USPC .......................................... 366/149; 366/228

(58) Field of Classification Search
CPC ....................................................... B01F 3/18
USPC ......................... 366/147, 149, 220, 228, 233
See application file for complete search history.

(56) References Cited

U.S. PATENT DOCUMENTS

| 277,250 A | 5/1883 | Espel |
| 499,890 A | 6/1893 | Savage |

(Continued)

FOREIGN PATENT DOCUMENTS

| CN | 1735453 | 2/2006 |
| DE | 1607767 | 7/1970 |

(Continued)

OTHER PUBLICATIONS

U.S. Appl. No. 12/717,166, filed Mar. 4, 2010; First Named Inventor: Ulrich Tölle. Copy not provided as application is available in IFW system per 37 CFR 1.98(a)(2)(iii).

(Continued)

*Primary Examiner* — David Sorkin
*Assistant Examiner* — Abbas Rashid
(74) *Attorney, Agent, or Firm* — Margaret Polson; Polson & Associates, PC

(57) ABSTRACT

A mixer 1 for thermal treatment of a material for mixing consisting of solid particles comprises a mixing vessel 2 for admitting the material for mixing. The vessel 2 has at least one thermal medium channel that with its surface gets at least partially in contact with the solid particles to be heat-treated, through which thermal treatment media are fed when the mixer 1 is in operation. Additionally, the mixer 1 has available a device for circulating the material for mixing found in the container 2. The container 2 is turnably supported about an axis R that penetrates the two front sides 7, 20. A motorized drive 17, 18, 18.1 serves as a circulating device to turn the container 2.

15 Claims, 7 Drawing Sheets

(51) Int. Cl.
*B01F 3/20* (2006.01)
*B01F 9/06* (2006.01)
*B29B 7/50* (2006.01)
*F28D 7/10* (2006.01)
*F28D 11/02* (2006.01)
*F28F 1/02* (2006.01)
*B01F 9/00* (2006.01)
*F28D 21/00* (2006.01)

(56) References Cited

U.S. PATENT DOCUMENTS

| | | | | |
|---|---|---|---|---|
| 1,489,538 | A | * | 4/1924 | Menk ................. 68/143 |
| 1,986,530 | A | * | 1/1935 | Read ................. 241/183 |
| 2,959,869 | A | * | 11/1960 | Ackerman ............. 34/135 |
| 3,191,874 | A | * | 6/1965 | Drinkwater et al. ...... 241/183 |
| 3,318,537 | A | * | 5/1967 | Wilhelm et al. ......... 241/183 |
| 3,341,183 | A | | 9/1967 | Bergstrom |
| 3,407,511 | A | * | 10/1968 | Camm ................. 34/109 |
| 3,853,458 | A | * | 12/1974 | Wurr et al. ........... 432/118 |
| 3,869,247 | A | * | 3/1975 | Deussner .............. 432/80 |
| 3,897,934 | A | * | 8/1975 | Phillips .............. 366/187 |
| 3,910,756 | A | * | 10/1975 | Henning .............. 432/118 |
| 4,036,875 | A | | 7/1977 | Brostrom |
| 4,100,613 | A | | 7/1978 | Schaeffer |
| 4,172,877 | A | * | 10/1979 | Schwaig .............. 422/205 |
| RE30,649 | E | | 6/1981 | Thompson |
| 4,289,279 | A | * | 9/1981 | Brandt ............... 241/102 |
| 4,432,650 | A | | 2/1984 | Langen |
| 4,781,468 | A | | 11/1988 | Herfeld |
| 5,427,947 | A | * | 6/1995 | Dalos ............... 435/290.3 |
| 5,603,567 | A | | 2/1997 | Peacock |
| 2004/0200296 | A1 | | 10/2004 | Dummer |
| 2006/0163260 | A1 | * | 7/2006 | Schmidt .............. 220/565 |
| 2010/0271900 | A1 | * | 10/2010 | Fisson et al. ......... 366/76.9 |

FOREIGN PATENT DOCUMENTS

| | | |
|---|---|---|
| DE | 1954563 | 5/1971 |
| DE | 2523875 | 12/1975 |
| DE | 19807476 | 9/1999 |
| DE | 20114490 | 12/2001 |
| EP | 0225495 | 6/1987 |
| GB | 1102975 | 2/1968 |

OTHER PUBLICATIONS

European Search Report for EP application No. 10663441, published as EP 2 255 869 A2 mailed May 18, 2011.
First Office Action in related Chinese application 201010186948.2, pp. 1-12.

* cited by examiner

MIXING MACHINE

CROSS REFERENCE APPLICATIONS

This application claims the benefit of German Application No Application No. 20 2009 004 866.7 filed. May 26, 2009, which is incorporated herein by reference for all purposes.

BACKGROUND

Mixers for heat treatment and/or for cooling a mixture of solid particles in a mixing vessel that has at least one heat-treatment central channel that at least partially gets in contact with the solid particles to be heat-treated are known. These mixers are typically used to cool a mixture of particles which has previously been mixed in a mixer. Therefore, such mixers are also designated as cooling mixers. Typically a so-called heating mixer is placed into the flow ahead of such a cooling mixer in the procedural chain. The product to be mixed is poured into it. In the course of the mixing process the particle mixture is heated by friction, so it then must be cooled to give the mixture further treatment. To do this the mixture is fed to a cooling mixer, which typically is attached directly to the outlet of a heating mixture. Such cooling mixers are often used with high-performance mixing systems for raw plastic products, such as powdered plastics for PVC manufacture.

Previously known cooling mixers have a vessel with a cooled inner wall. The vessel is designed with a dual wall, with cold water being channeled into or through the channels forming the dual wall. Therefore a part of a cooling channel forms the interior wall of the vessel, with the product for mixing being fed past this cooled wall section during the mixing process. In the vessel there are motor-driven mixing tools for circulating the mixture to be cooled. Thus, the mixing tools with their motor drive represent a circulating device to circulate the mixture to be cooled.

The vessel of such a cooling mixer typically has a circular cross sectional surface. The horizontal cooling mixer and vertical cooling mixture are different depending on a horizontal or a vertical alignment of the vessel. In both cases, the inner side of the annular wall of the vessel forms the cooling surface at which the mixture is cooled during circulation s by the mixing tools. Each mixing vessel has available two attachment connector pieces, one by which the cooling mixer is attached to the output of an upstream high-performance mixer, and another one for expelling the cooled material for mixing. With vertical cooling mixers, the filling connector piece is attached to the top cover flap. The emptying connecting piece is on the radial outer side of the annular sidewall. With a horizontal cooling mixture, the outlet connector piece and the filling connector piece typically are in the middle of the overall cylindrical cooling vessel, with the filling connector piece at or near the upper apex and the outlet connector piece at or near the lower apex of the mixing vessel.

Wear is observed on the vessel walls with known cooling mixers, particularly in the areas of the motion paths of the mixing tools, even if they do not actually touch the inner side of the vessel walls. This is not desirable. In addition, the cooled mixture can be contaminated by the material that is rubbing off. Care must be taken when such a cooling mixer is operated that the procedural time that is necessary to cool a batch of mixture is not longer than the procedural time needed to conduct complete the mixing, for example by an upstream heating mixer. This is especially true with mixing of a temperature-critical mixture. As for example, this is decisive when mixing powdered plastic for PVC manufacture. Inside the cooling mixer within such a procedure, not only must the inserted material for mixing be cooled to the needed temperature, but also the additional treatment must have been concluded, namely filling the vessel and expelling the cooled mixture.

It is desirable for the inserted material to be cooled as uniformly as possible when such a cooling mixer is in operation. Due to the placement of the outlet connector piece on the cooled wall of the vessel, this part of the vessel does not contribute to the cooling of the inserted mixture. Owing to this, in that area in which the material to be cooled is in contact with the inner vessel wall, cooling surface is lost.

It is expensive to clean such a previously known cooling mixture when one switches over from one material for mixing to be cooled to another one. This is due a portion of the mixture cannot be emptied using the normal means due to the geometry of the mixing vessel, and therefore remains in the mixing vessel. Additionally, the mobile tools for circulation must be cleaned.

The foregoing example of the related art and limitations related therewith are intended to be illustrative and not exclusive. Other limitations of the related art will become apparent to those of skill in the art upon a reading of the specification and a study of the drawings.

SUMMARY

On aspect of the present disclosure is to provide cooling mixer of the type named initially, in which the vessel is turnably supported about an axis that penetrates both of the front sides, and a motorized drive for turning the vessel is provided as the circulating device.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In contrast to previously known cooling mixers with mixing tools placed so as to turn in a mixing vessel, this mixer has available a turnably supported vessel. The vessel is motor-driven to turn. With this, the motor drive of the vessel represents the circulating device to circulate the material for mixing inserted into the vessel, or if additional components participate, at least partially so. The vessel is turnable about its longitudinal axis, which at least for the mixing process is directed horizontally or approximately horizontally. Thus, during the mixing process, the axis of rotation penetrates the front sides of the mixing vessel. It is understood that the axis of rotation does not have to bodily penetrate the front sides of the mixing vessel. Rather, by this the position of the axis of rotation is meant. When the vessel rotates, the material for mixing found inside it is circulated and in this move is successively brought in contact with the inner jacket surface of the vessel. Since preferably the vessel is driven to rotate, the entire vessel inner wall made available can be used as a usable cooling surface. The advantage of this is that due to the possibilities of using the entire inner vessel wall as a thermal treatment surface, the mixing vessel and thus the mixer as a whole can be designed to be more compact. For the purposes of cooling, as a rule it is not the entire inner wall of the thermal treatment mixer that is brought in contact with the temperature-treated material for mixing, for example to be cooled. With a rotationally driven mixing vessel, the material for mixing to be temperature-treated lies partially at the inner vessel wall. The result of this is that each vessel wall section is cyclically in contact with the material for mixing only over a certain segment of rotational angle. For a mixer designed as a cooling mixer, this means that a vessel inner wall section that is rotated out from the material for mixing is cooled overall in the course of further rotary motion and continuing cooling, before this vessel inner wall section again gets in contact with the material for mixing to be cooled. Then, due to the turning motion of the vessel inner wall, the inner wall section cooled off in this way again gets in contact with the material for mixing to be cooled in this embodiment example. This explains the especially effective and therefore time-saving cooling. The same is true in reverse fashion for a case in which material for mixing is to be heated with such a mixer.

Fundamentally an oscillatory drive of the vessel is also conceivable, with oscillatory motion preferably performed until at least the peripheral vessel sections that point in the direction of motion are brought out of the material for mixing in the course of the oscillatory motion.

In the depicted embodiment, the mixer is designed as a cooling mixer. Fundamentally this requires no mixing tools, and in particular no driven mixing tools. In contrast to previously known cooling mixers, with this cooling mixer, little or no heat is infused into the mixture during the circulation. This phenomenon is observed with the previously known cooling mixers. For this reason with the cooling mixer according to the present disclosure, a more effective cooling is possible. The attachment connector pieces necessary to attach the mixing vessel to a feed for material for mixing as well as an outlet line typically are located on the front sides of the preferably cylindrical vessel. With this cooling mixer, the entire cylindrical jacket surface can be used as a cooling surface.

According to one embodiment example, provision is made that the vessel is supported to swivel about an axis running transverse to its turning axis in addition to being rotatable. This pivoting suspension of the vessel permits the vessel to be adjusted from a filling setting into a mixing setting with a longitudinal axis that is horizontal or runs slightly inclined thereto. Then the mixing vessel can be pivoted out of its mixing setting into an emptying setting, in which the cooled mixture can be drained from the vessel. The emptying setting can be the same as the filling setting, or different from it. In a configuration in which the mixing vessel assumes a different position during mixing than in its filling setting and/or its emptying setting, attachment connector pieces are used that are designed as couplings for removable attachment onto complementary couplings of a mixture feed or a drain line. The flaps or valves necessary to close or open a feed-in or -out of the two coupling parts can be opened or closed manually or by use of an actuator-impinging setting adjustment medium such as air. The pivoting support of the vessel also permits a configuration in which the mixing vessel has only a single attachment connecting piece, via which the vessel can be filled and also emptied. Then filling, the vessel is brought into a position such that from the material-for-mixing feed the mixture can drain from above into the vessel. Through pivoting, this attachment connector piece can be brought into a downward pointing direction to empty the vessel. Typically the vessel's mixing setting is between these two end settings.

The vessel according to one embodiment example is seated in a rack, vis-à-vis which the vessel is pivotable. For turnable support, a roller seating can be provided, with the vessel in typical fashion having guide rails available with such a configuration, into which the rollers of the roller seating engage. At least one of these rollers is motor-driven for turning the vessel. With such a configuration, the rollers not only function to provide turnable support for the rotating vessel, but they also hold the vessel, through their engagement into the guide rails, when it is pivoting about its pivoting axis running transverse to the turning axis. Then the guide rails are suspended on the rollers of the roller seating. In one embodiment the guide rails are designed as U-guides that are open outward in the radial direction, with the gap of the side walls corresponding to the thickness of a roller engaging therein. Instead of, or in addition to the seating described, holding rollers and/or pairs of holding rollers can be provided to hold the turnable mixing vessel. These typically engage on the outer sides of at least one guide rail, so that at least a share of the weight of the mixing vessel is eased in a non-horizontal direction via the holding roller or pairs of holding rollers into the rack.

The inner wall of the vessel can be profiled by baffles, preferably in a longitudinal-axis direction, with these baffles in appropriate fashion being designed as coolant channels. By this means, the inner surface of the vessel, and thus the cooling surface made available, is enlarged. These baffles improve not merely the cooling performance, but also improve circulation of the material for mixing to be cooled that is found therein.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
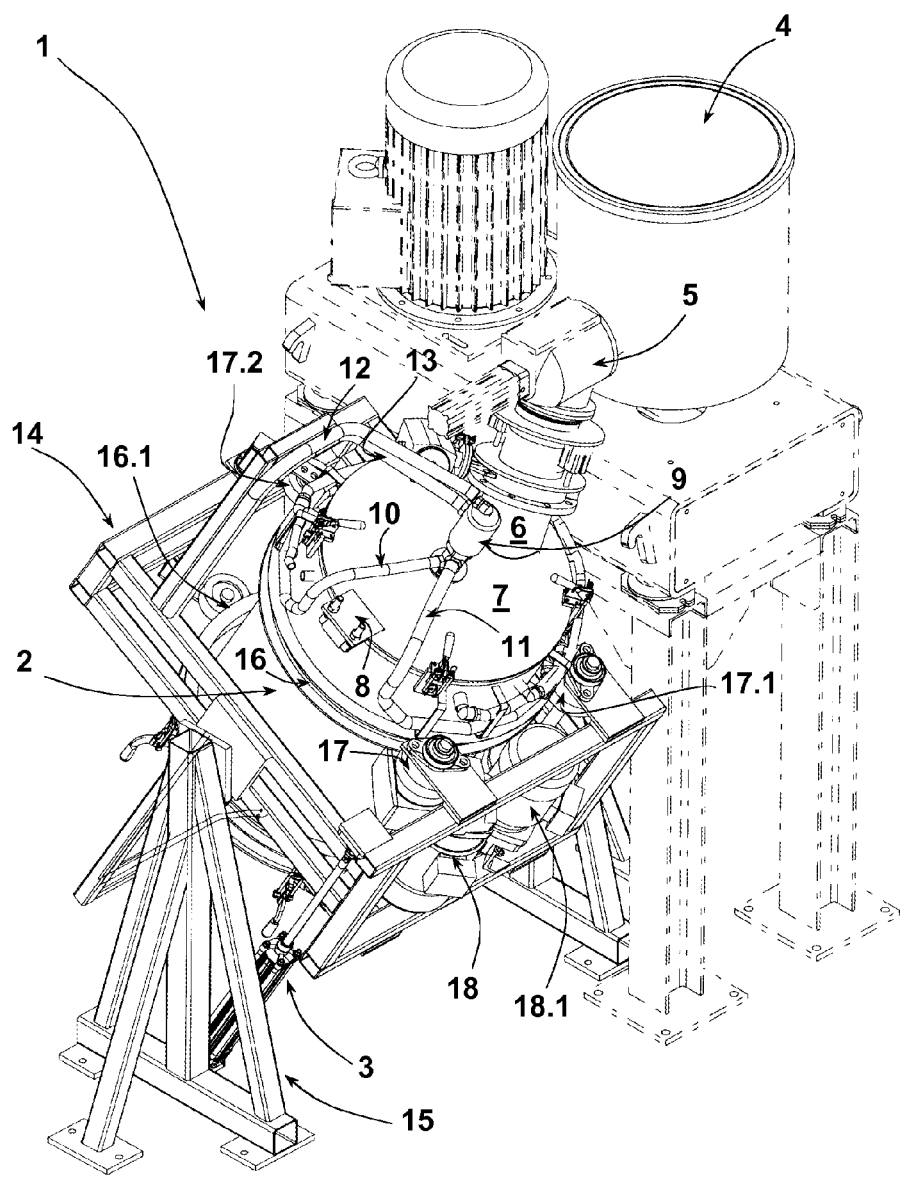
FIG. 1 is a perspective view of a cooling mixer in its filling setting, attached to a material-for-mixing feed.
Figure 3:
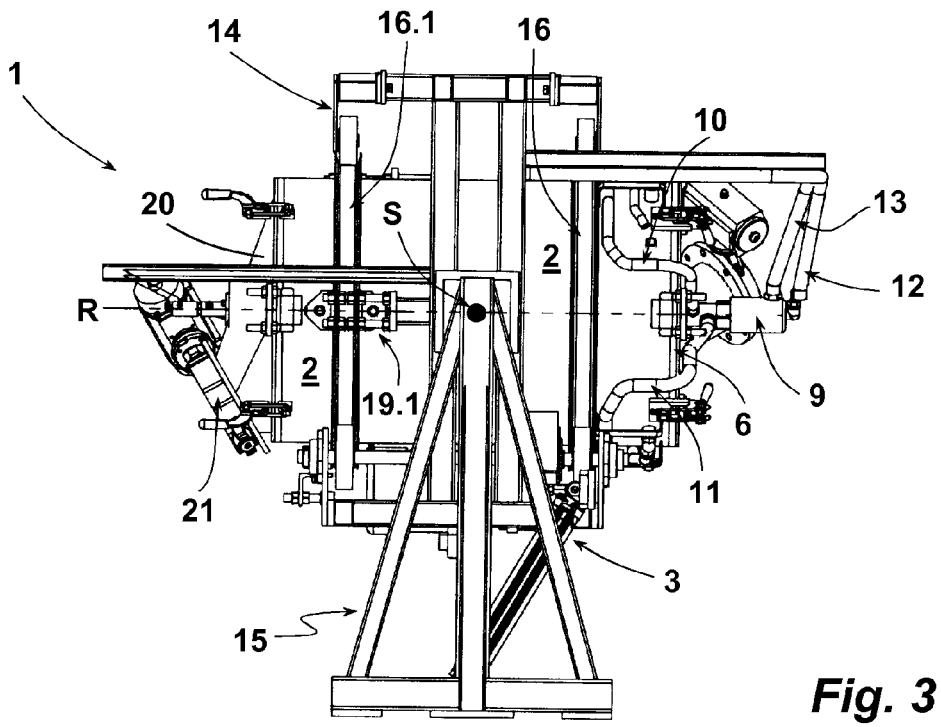
FIG. 3 is a side view of the cooling mixer of FIGS. 1 and 2 in its mixing setting.

A thermal-treatment mixer designed as a cooling mixer 1 has a mixing vessel 2, which is pivotable by means of an adjustment cylinder 3 about a horizontally running pivoting axis S (see FIG. 3). In FIG. 1, cooling mixer 1 is adjoining mixing vessel 2 in its filling position. The filing position is the extended end setting of adjustment cylinder 3. Next to cooling mixer 1 in FIG. 1 is a heating mixer 4 in dotted lines. The outlet of the heating mixture 4 forms the material-for-mixing feed 5 for cooling mixer 1. In its filling position shown in FIG. 1, mixing vessel 2 is attached by means of a pneumatically activated coupling to material-for-mixing feed 5. The coupling is by means of a filling connecting piece, on the free end of which the vessel-side coupling member of filling connecting piece 6 is connected to the coupling member on the side of the material-for-mixing feed. The filling connecting piece provides accessibility from the material-for-mixing feed 5 into the interior of mixing vessel 2. Part of the material-for-mixing feed 5 is a valve for opening and closing the material-for-mixing feed 5, which typically is configured as an adjustment flap. Filling connecting piece 6 or the coupling member on the filling-connecting piece side also has a locking mechanism to close filling connecting piece 6, if it is not attached to material-for-mixing feed 5. Such a lock can also be designed according to the type of a flap or according to the type of a lamellar cover. The vessel-side locking mechanism can be activated pneumatically.

As can be seen in FIG. 1, filling connecting piece 6 is located on the front side 7 of mixing vessel 2 which otherwise is configured as a cylinder. Filling connecting piece 6 is eccentrically placed on front side 7. The front 7 is designed as a flap and for cleaning purposes can be opened by means of a hinge 8. Integrated into front side 7 is a rotary transmission lead-through 9 for admitting cooling liquid, for example coolant water, into the vessel walls as well as for expelling cooling liquid heated in the course of a cooling procedure. The vessel-side inlet is designated in the figures by reference number 10 and the return line by reference number 11. On the stator side, an inlet line 12 and a drain line 13 are attached to rotary transmission lead-through 9. A cooling fluid is fed at a certain pressure via inlet line 12. The cooling liquid heated is drained out through mixing vessel 2 via drain line 12 in the course of cooling.

Mixing vessel 2 is held in a pivoting rack 14 which pivots on a base rack 15 by means of the adjustment cylinder 3 previously described. Thus adjustment cylinder 3 is braced on one side on ground rack 15 and on the other side on pivoting rack 14, as is especially evident in FIGS. 1 and 3. Mixing vessel 2 in turn is turnably supported about its longitudinal axis that centrically penetrates the two front sides and motor-driven to exert a turning motion about the longitudinal axis in pivoting rack 14. Thus the longitudinal axis forms the rotational axis R (see FIG. 3) of vessel 2. The rotary transmission lead-through 9 is coaxially relative to rotational axis R. Two U-shaped profiled guide rails 16, 16.1, that are open in the outward radial direction and situated at an interval to each other support mixing vessel 2. The guide rails are placed concentrically to rotational axis R. Three rollers engage into guide rails 16, 16.1, which are made visible with reference numbers 17, 17.1, 17.2 only for guide rail 16 for the sake of clarity. At least one of these rollers 17, 17.1, 17.2 is motor-driven. In the depicted embodiment example, roller 17 is driven by an electric motor 18. When roller 17 is driven, guide rail 16, and mixing vessel 2 as unit with guide rails 16, 16.1 is placed in rotation since roller 17 braces on guide rail 16. In FIG. 1, an electric motor 18.1 drives the motor-driven roller that engages into guide rail 16.1. The rotational rate of mixing vessel 2 is adjustable.

In an additional embodiment example, instead of profiling guide rails 16, 16.1 being U-shaped, they can have closed guide profiles, especially rectangular ones. In this configuration, the roller drive is designed so that the motor-driven roller typically engages on the side facing outward, and the guide rail runs between two additional guide rollers.

Corresponding stops and/or sensors and/or microswitches are attached on the material-for-mixing feed 5 for positionally exact pivoting of mixing vessel 2 by actuating adjustment cylinder 3. The actuators for opening the particular flaps or valves in material-for-mixing feed 5 and in the filling connector piece 6 or in the coupling piece related to this can only be actuated for opening if according to their purpose, the two coupling members are in engagement with each other. The filling connecting piece 6 couples in fully automatic fashion to the material-for-mixing feed.

Figure 2:
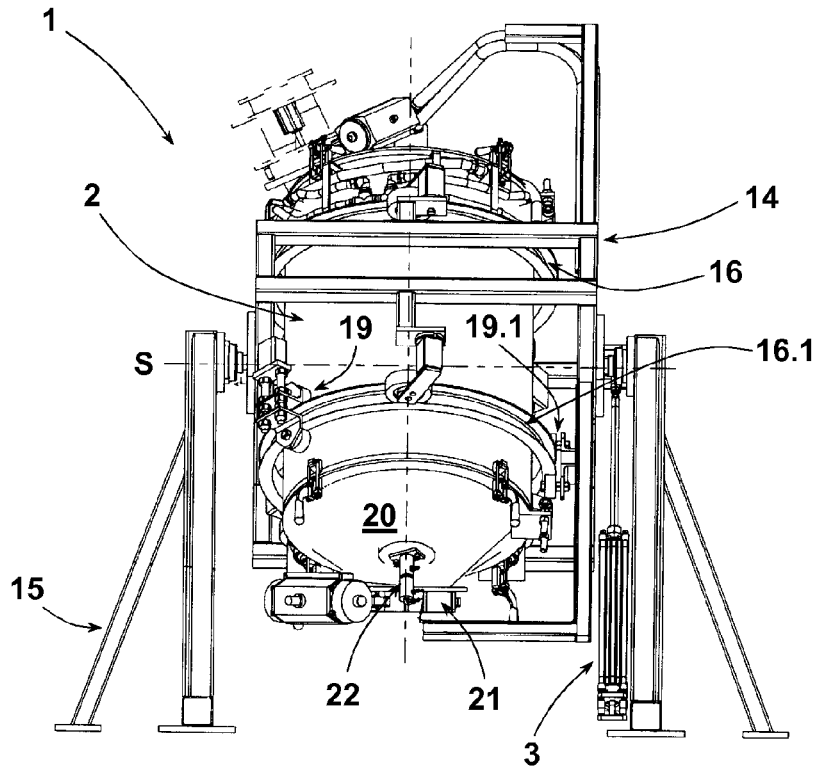
FIG. 2 is a rear view of the cooling mixer from FIG. 1.

FIG. 2 shows cooling mixer 1 in its setting shown in FIG. 1 in a rear view without the heating mixer shown with dashed lined in FIG. 1. In addition to the previously described rollers responsible for seating of mixing vessel 2 about its rotational axis R, three additional pairs of holding rollers engage, of which only two pairs of holding rollers 19, 19.1 are visible. Holding roller pairs 19, 19.1 each have two spaced apart rollers The rollers have an interval from each other so that they adjoin the outer side walls of the U-shaped profiled guide rail 16.1. Thus, depending on the spatial position of mixing vessel 2, its weight, or at least a part of its weight, is picked up by holding roller pair 19, 19.1 and passed to the racks 14, 15.

The front side 20 of mixing vessel 2 opposite front side 7 is also designed as a flap shaped like a truncated cone. R. Front side 20 has an emptying connecting piece 21 which is eccentric relative to rotational axis, by means of which the cooled material for mixing can be emptied from mixing vessel 2. A part of emptying connecting piece 21 is also a locking element, through which emptying connecting piece 21 is closed when not used. Just like the locking element in filling connecting piece 6, the locking element in emptying connecting piece 21 is able to be pneumatically activated in the depicted embodiment example. A rotary transmission lead-through 22 is placed centrically with, and thus aligned with, rotational axis 4 of mixing vessel 2 on front side 20. Rotary transmission lead-through 22 transfers pressurized air made available from the stator side to the actuators placed on turnably supported mixing vessel 2, namely the actuators for operating the locking elements in filling connecting piece 6 and emptying connecting piece 21.

FIG. 2 shows the cooling mixer with its mixing vessel 2 in the emptying setting, in which emptying connecting piece 21 is attached to a drain line not depicted in the figures. Thus, the setting of mixing vessel 2 shown in FIGS. 1 and 2 represents both its filling setting and its emptying setting. As a consequence of this, immediately after the emptying process and closing of emptying connecting piece 21 have been completed, filling connecting piece 6 can be opened and the next batch of material for mixing to be cooled can be injected via the material-for-mixing feed 5 into the interior of the vessel. This is appropriate precisely when processing times are short.

For carrying out the actual mixing process, mixing vessel 2 is pivoted by adjustment cylinder 3 relative to its setting shown in FIGS. 1 and 2, until its rotational axis R reaches the horizontal, as shown in FIG. 3. In this position, mixing vessel 3 is transferred via electric motors 18, 18.1 and the driving rollers engaging into guide rails 16, 16.1 into a turning motion. The material for mixing to be cooled, found inside mixing vessel 2, is cooled in the course of this process on the inner wall of mixing vessel 2, and successively circulated in the course of the turning motion of mixing vessel 2. Depending on the material to be cooled, it can be appropriate to superimpose the turning motion of mixing vessel 2 for mixing and circulating the material for mixing with an oscillating pivoting motion about pivoting axis 2.

During the cooling process, feed line 12 and therefore inlet 10 attached on the vessel side, is impinged on by cooling liquid, water for example, at a certain pressure. The cooling water is injected via inlet 10 into the coolant channel integrated into the dual wall of mixing vessel 2. Provision can be made that vessel 2 has multiple circulatory loops of coolant. The heated cooling water guided back via return 11 from the circulatory coolant loop is removed via return 11, rotary transmission lead-through 9 and drain line 13.

Figure 4:
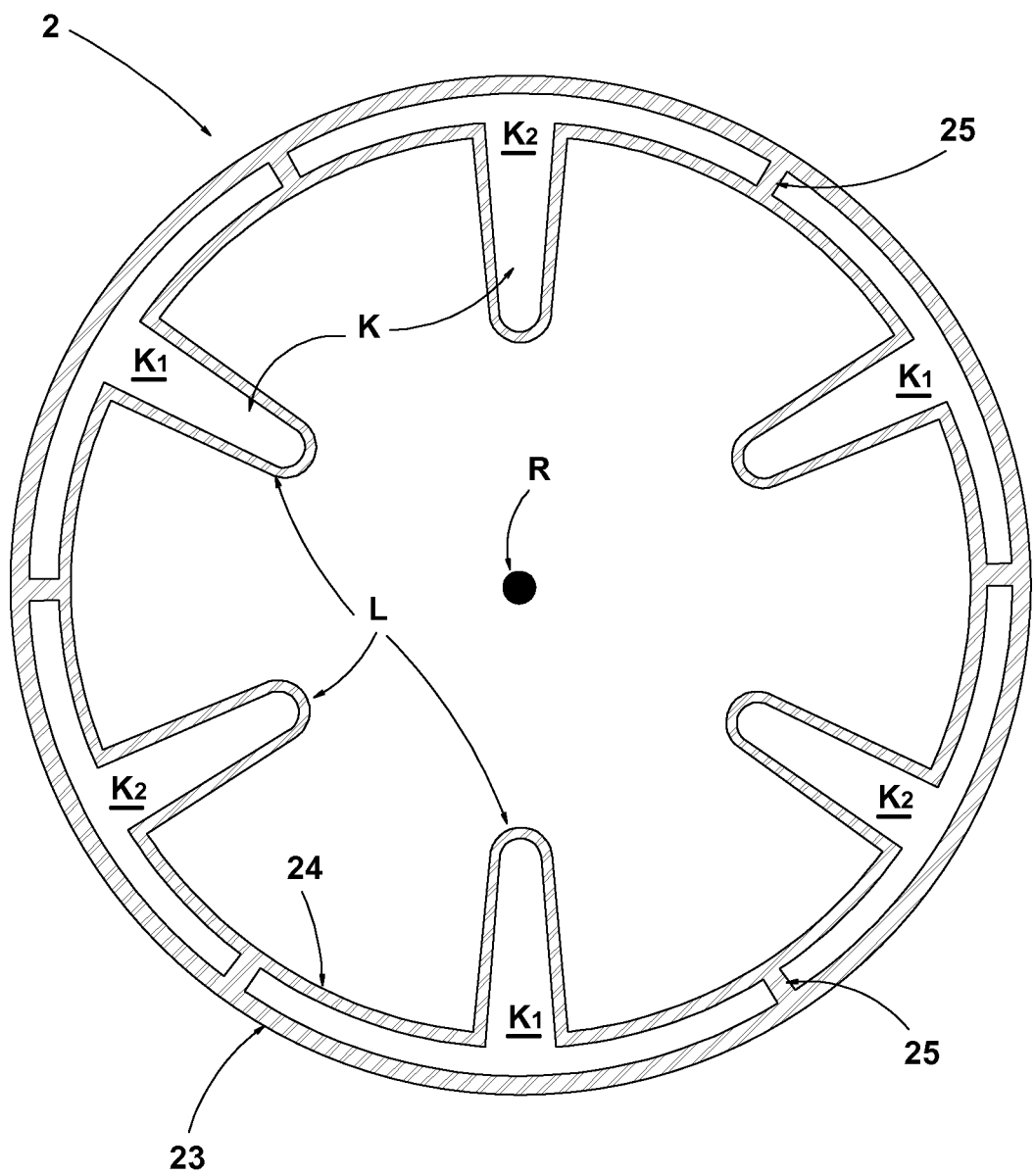
FIG. 4 is a schematic cross-sectional view of the mixing vessel of the cooling mixture from the previous figures.

Using an embodiment example, FIG. 4 schematically shows a possible design of the coolant channels of mixing vessel 2, which is shown only schematically in FIG. 4 and without the additional elements and aggregates visible in the previous figures. Mixing vessel 2 is designed to be dual-walled. The outer wall is designated by reference number 23 and the inner wall by reference number 24.

The cavity situated between outer wall 23 and inner wall 24 is subdivided by multiple partitions 25 into individual coolant channels K. In the embodiment example shown in FIG. 4, a total of three circulatory loops is shown, each loop having an entry channel $K_1$ and a return channel $K_2$, which are connected with each other in the area of front side 20.

Inner wall 24 is roughened by hollow strips L projecting inward in the radial direction. The hollow strips L are each a part of a coolant chamber K. Owing to this measure, not only is the inner surface of inner wall 24 and thus the surface made available for cooling expanded, but also the hollow strips L provide support to the circulation process of the material for mixing inserted into it when mixing vessel 2 is rotated.

It is understood that the concept of mixing vessel 2, as shown in FIG. 4, is only one of numerous possibilities of cooling or roughening the inner jacket surface of a mixing vessel. For example, instead of the hollow strips L shown in the embodiment example, numerous smaller corrugated structures can also be provided.

Figure 5:
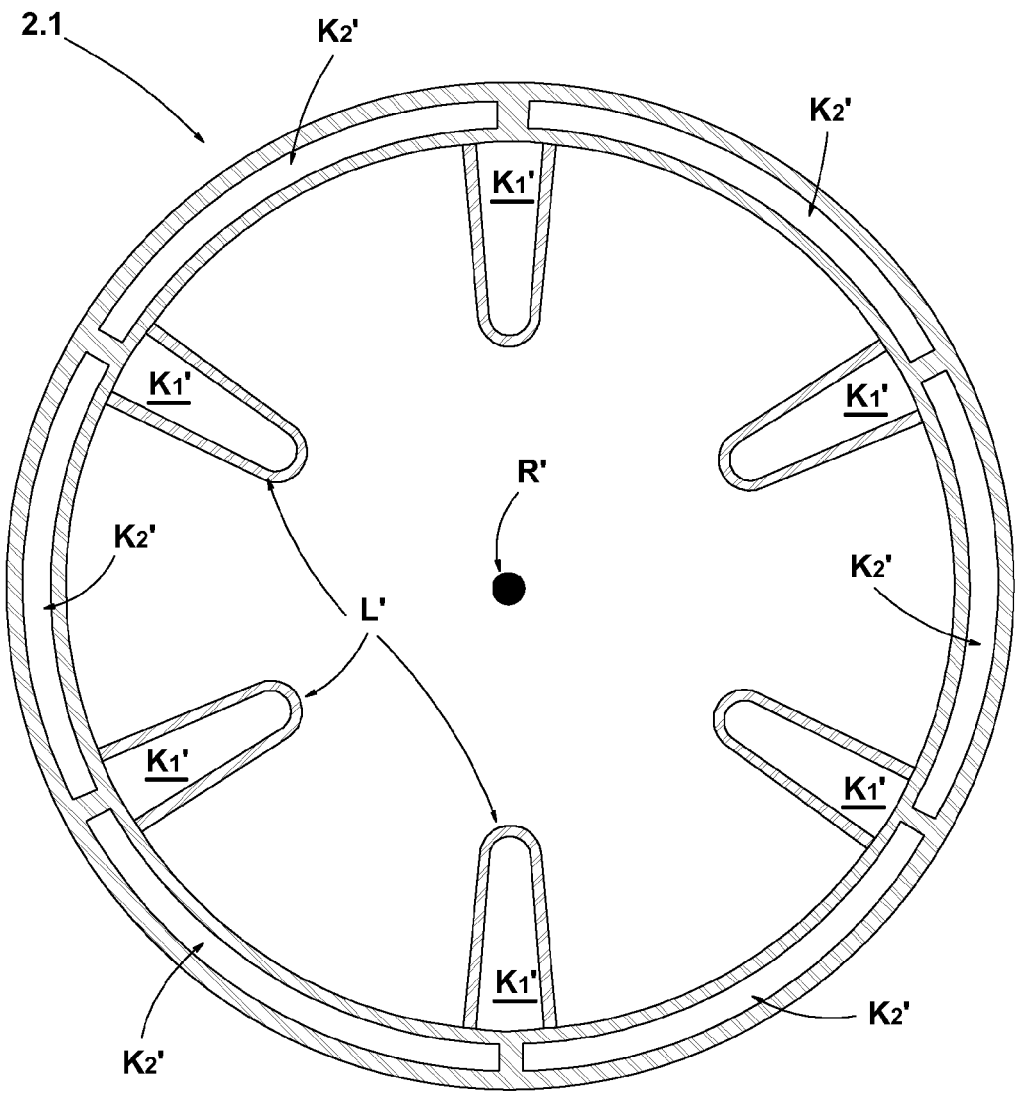
FIG. 5 is a schematic cross-sectional view of another mixing vessel of a cooling mixer.
Figure 6:
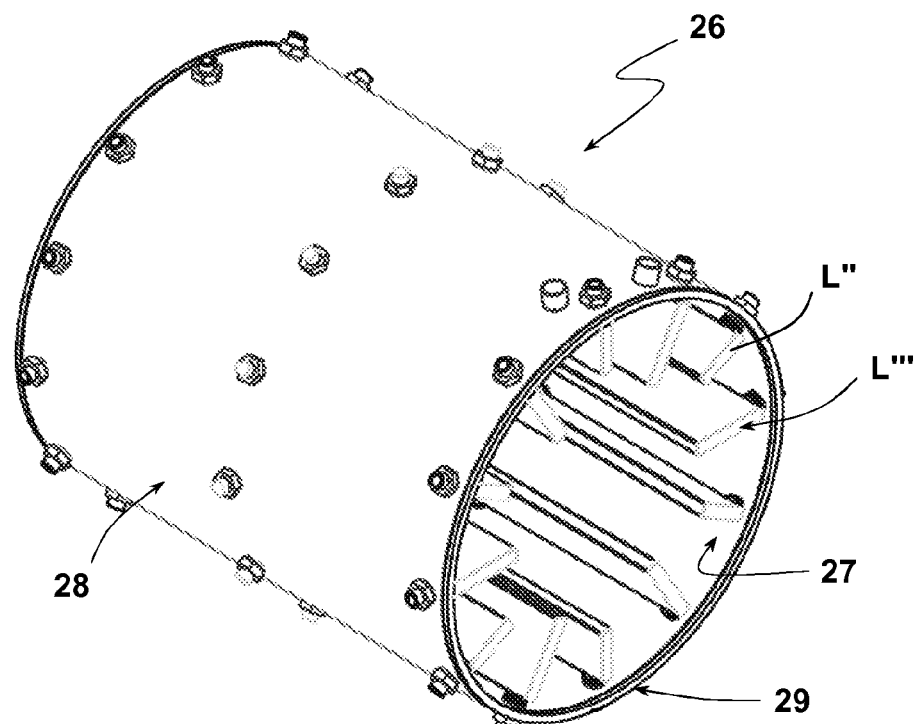
FIG. 6 is a perspective view of the cylindrical part of a mixing vessel of a cooling mixer according to another configuration.

FIG. 5 shows one of multiple additional possibilities to configure the coolant channels in the mixing vessel of a cooling mixer. In principle, mixing vessel 2.1 of the embodiment example of FIG. 5 is designed the same as mixing vessel 2 of FIGS. 1 to 4. What causes mixing vessel 2 to differ from mixing vessel 2 is only the guidance of its coolant channels. In mixing vessel 2.1, the coolant channels $K_1'$ configured as hollow strips L' are the entry channels, with these limited to the hollow strips L'. The return channels $K_2'$ are placed in the cavity situated between the two walls, and, as in the embodiment example of FIGS. 1 to 4, separated from each other by partitions.

After the mixing process has been carried out, mixing vessel 2 is again brought to its filling and emptying setting shown in FIGS. 1 and 2, and after emptying connecting piece 21 is attached to a drain line, it is opened for emptying.

The previously described configuration of the interior of mixing vessel 2, with its hollow strips L following the long dimension, which extend in essence over the cylindrical section of mixing vessel 2 and the inclined placement for emptying shown in FIGS. 1 and 2, in which emptying setting emptying connecting piece 21 is in the lowest area of front side 20 that forms a truncated cone, make clear that the cooled material for mixing can drain totally out of the mixing vessel. Owing to the inclination of the mixing vessel in its emptying setting, the draining process also happens quicker than is the case with traditional mixers. This, and the fact that the front sides 7, 20 of vessel 2 can be opened, make it clear that the interior of mixing vessel 2 can be cleaned considerably more easily, especially since in it, in contrast to prior art, no movable, motor-driven tools are placed that must be cleaned. The mixing vessel can be cleaned in the shortest time. Due to the fact that the mixing vessel can be pivoted, the material-for-mixing feed does not need to be pivoted or dismantled to clean the mixing vessel.

In a further embodiment example, FIGS. 6 to 9 show a mixing vessel for a thermal treatment mixer that is also used like mixer 1 of FIGS. 1 to 5 as a cooling mixer. To permit a view into the interior of it, mixing vessel 26 is shown without the end head pieces. Just like the mixing vessels in the previous figures, mixing vessel 26 has available hollow strips L" and L'" which have heat-treatment liquid, especially cooling liquid, flowing through them just like hollow strips L, L' from the previously described embodiment examples. In contrast to the configuration of mixing vessels 2, 2.1 in the previously described embodiment example, hollow strips L" and L'" are ones whose attachments extend through mixing cylinder 28 designed with dual walls. Thus, with the embodiment example depicted, the attachments to close the liquid-feed lines lie on the outer jacket surface of mixing vessel 26. With this provision is made that the attachments of the individual hollow strips L", L'" that penetrate the vessel wall are not in direct liquid connection with the liquid access between inner vessel wall 27 and outer vessel wall 29.

In the depicted embodiment example, each hollow strip L", L'" in the area of its inlet and drain, as well as in a central area on the mixing vessel wall, is attached in the manner previously described. The center attachment found between the two end attachments serves only for holding a hollow strip L" or L'", while the two end attachments are provided in addition for attachment to the circulatory coolant flow circuits.

Figure 7:
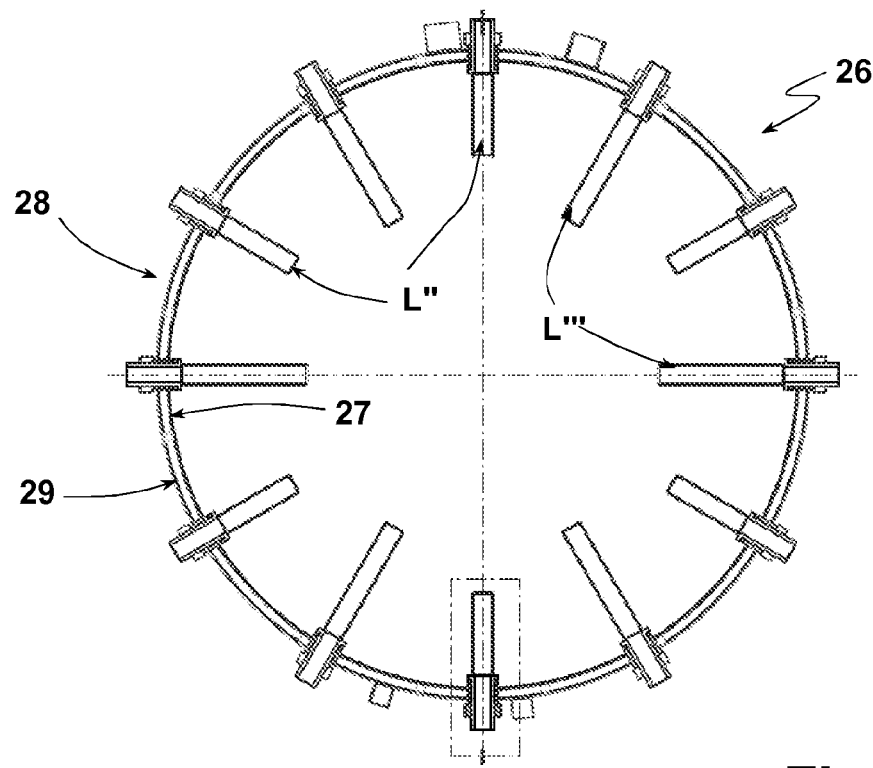
FIG. 7 is a front view of the mixing vessel from FIG. 6.

From the FIG. 7 side view it is clear that hollow strips L", L'" in the depicted embodiment example have a height different from that of the interior wall 27 of mixing vessel 26.

Figure 8:
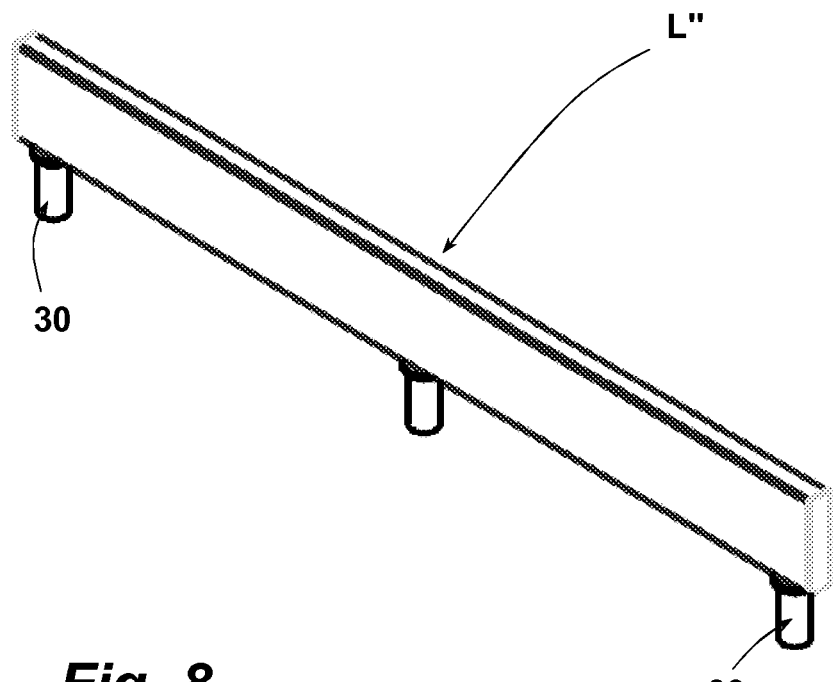
FIG. 8 is a perspective view of a coolant channel designed as a hollow strip.

In a perspective view, FIG. 8 shows a hollow strip L". Hollow strip L" is designed with a rectangular cross section and essentially extends over the entire length of the section of the mixing vessel shown in FIG. 6—of mixing cylinder 28.

Figure 9:
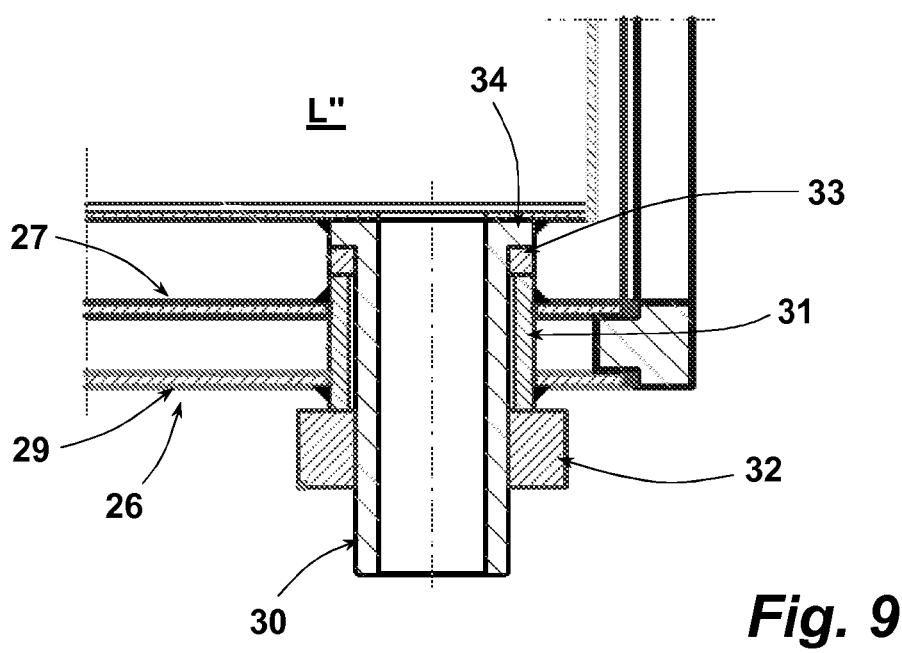
FIG. 9 partial cut away view an attachment of a hollow strip through the vessel wall of the mixing vessel of FIGS. 6 and 7.

The FIG. 9 cross sectional view shows the engagement of a liquid attachment of a hollow strip L". The dual vessel wall consisting of inner wall 27 and outer wall 29, that also has liquid flowing between the two walls 27, 29, has a passage formed by a pipe piece 31 for insertion of an attachment connecting piece 30 of hollow strip L" through the vessel wall. As shown in FIG. 9, pipe piece 31 is inserted into the dual mixing vessel wall to seal against liquid entry. Attachment connecting piece 30 penetrates pipe piece 21 and is secured to it by means of a nut 32. A spacer piece 33 is located between the base 34 of attachment connecting piece 30 and pipe piece 31. Onto the end of attachment 30 that projects outward from vessel 26, a connection line is placed that is not shown in the figure, to connect attachment connecting piece with the attachment connecting piece of an adjoining hollow strip L'" or L". Hollow strips L", L'" are assembled into groups, as is described in reference to the coolant channels of FIGS. 4 and 5.

The concept of arranging hollow strips within mixing vessel 26 as described in FIGS. 6 to 9 permits a very flexible configuring of the mixing vessel. Depending on the particular desired requirement, fewer or more hollow strips are installed. This depends on the material to be thermally treated, especially cooled, the anticipated dwell time of same inside mixing vessel 26, and the size of same. In addition, a mixing vessel with hollow strips, as described for the embodiment example of FIGS. 6 to 9, is easier to manufacture than to produce the channels in the embodiment example of FIG. 4 or 5.

There also exists an option, through replacement of individual hollow strips within such a vessel, as described for the embodiment example 6 to 9, to adapt such to various circumstances. Thus for example by installation of larger hollow strips, and thus of strips with a larger heat-treatment surface, the mixer has the capacity for greater performance. With the concept of a cooling mixer as described for FIGS. 6 to 9, a possibility also exists that to enlarge the heat-treatment surface, hollow strips can be mounted one on another, and thus a first hollow strip attached to the vessel wall could carry a wider hollow strip on its narrow side facing away from the vessel wall. This is in liquid connection with the first hollow strip placed on the vessel wall.

The concept described in the embodiment example of FIGS. 6 to 9, in which the inserted hollow strips penetrate the mixing vessel wall and are attached using nuts, also permits same to be replaced, if the mixing vessel must be retrofitted for purposes of mixing another material for mixing.

Figure 10:
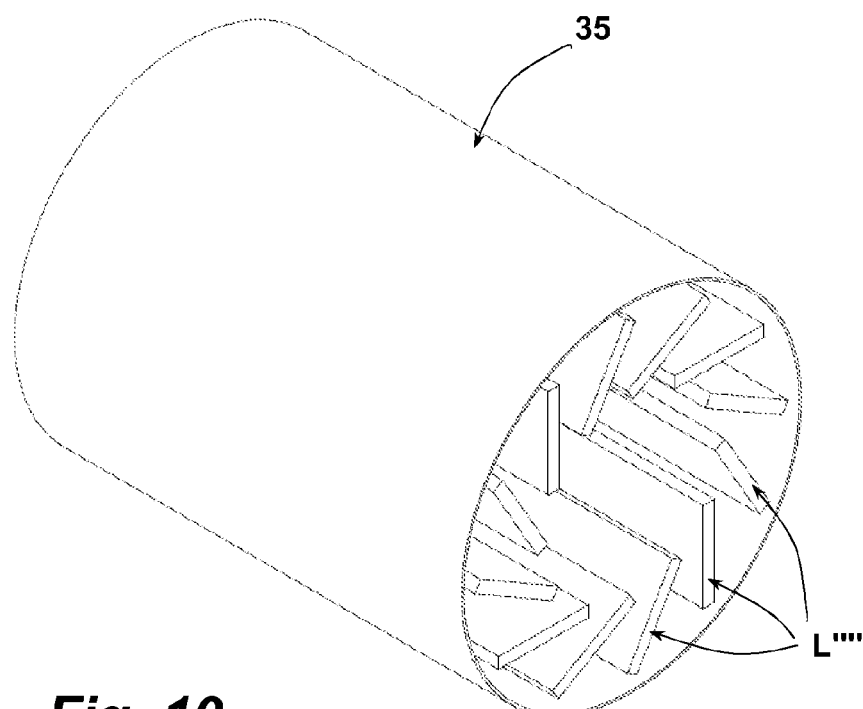
FIG. 10 in a perspective view the cylindrical part of an additional mixing vessel of a cooling mixer according to still another configuration.

FIG. 10 shows yet another mixing vessel 35 for a heat-treatment mixer, for example a heat-treatment mixer used as a cooling mixer. In principle this is designed like mixing vessel 26, In contrast to mixing vessel 26, the hollow strips L'''' are inclined relative to inner wall 36 of mixing vessel 35, versus the arrangement of hollow strips L'', L''' of the embodiment example described earlier. For the sake of simplicity, the attachment connecting pieces of hollow strips L'''' are not shown in FIGS. 10 and 11.

Figure 11:
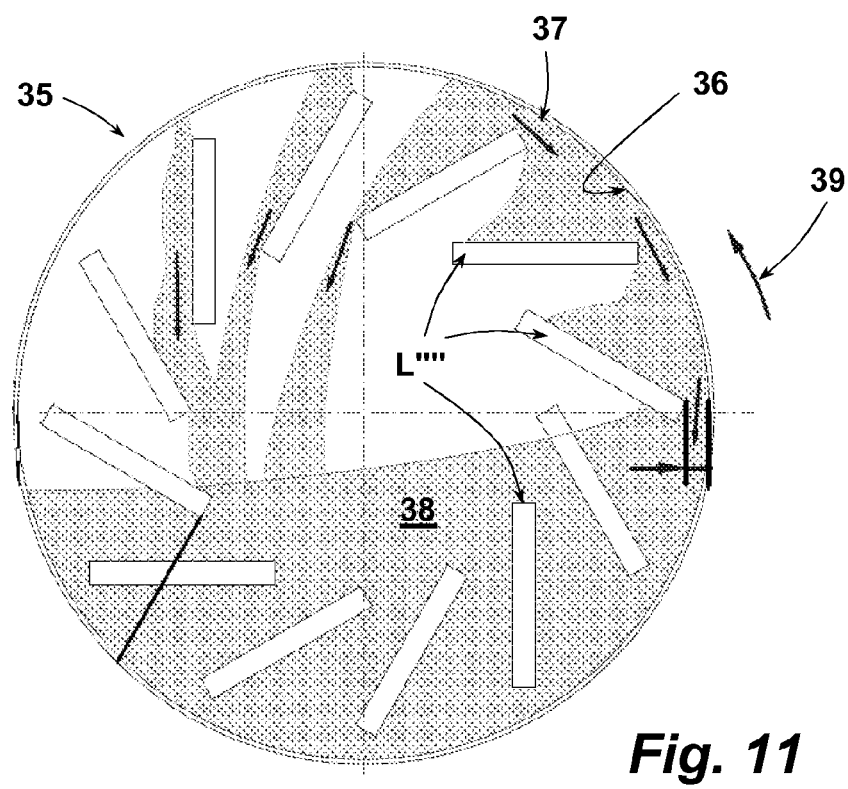
FIG. 11 is a front view the mixing vessel of FIG. 10

The hollow strips L'''' of mixing vessel 35 are placed at intervals to the inner wall 36 of mixing vessel 35 designed with dual walls. Thus, between inner wall 36 of vessel 35 and the hollow strips L'''', a gap 37 is found, as FIG. 11 shows, through which material for mixing 38 can penetrate. If desired, the inclination of hollow strips L'''' and/or their distance from inner wall 36 can be adjusted. Owing to the inclined placement of the hollow strips L'''' pointing in rotational direction 39, it is possible to carry material over a larger angular range. FIG. 11 uses arrows embedded in material for mixing 38 to show its direction of motion when mixing vessel 35 is rotated in the rotational direction indicated by arrow 39.

Depending on the particular pre-set or adjusted gap with between the hollow strips L'''' and inner wall 36 of mixing vessel 35, the feeding performance of hollow strips L'''' is adjustable. The rate at which mixing vessel 35 is rotationally driven can serve as a further variable to determine feed performance.

The material moves through the gap between hollow strip L'''' and the inner wall 36, against the turning direction 39 of mixing vessel 35 over a relatively large turning angle range, so that the cooling power of mixing vessel 35 thus designed is especially effective.

The mixing vessels described in FIGS. 6 to 11 are part of a cooling mixer in a way and manner not described in greater detail, as this is described from the principle in FIGS. 1 to 3. Mixing vessels 26, 35 can be turned about their longitudinal axis for the purpose of mixing. Thus the turning axis is in the area of the front sides not depicted in these figures.

From the specification of the invention it is clear that since no movable parts are placed within the mixing vessel, which contrasts with previously known mixers, the danger of sparks being formed is reduced to a minimum.

The invention has been described by way of example using cooling mixers. In the same way, the mixer described can also be used for heating a material for mixing. With such a concept, the cooling medium accesses described in the previous embodiment examples are impinged on by a medium that is at a higher temperature than the temperature of the material for mixing.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true sprit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

LIST OF REFERENCE NUMBERS

1 Cooling mixer
2, 2.1 mixing vessel
3 adjustment cylinder
4 Heating mixer
5 material-for-mixing feed
6 filling connecting piece
7 front side
8 hinge
9 rotary transmission lead-through
10 inlet
11 return line
12 feed line
13 drain line
14 pivoting rack
15 base rack
16, 16.1 guide rail
17.1, 17.2 roller
18, 18.1 electric motor
19, 19.1 pair of holding rollers
20 front side
21 emptying connecting piece
22 rotary transmission lead-through
23 outer wall 24 partition
26 mixing vessel
27 inner wall
28 mixing cylinder
29 outer wall
30 attachment connector
31 pipe piece
32 nut
33 spacer piece
34 base
35 mixing vessel
36 inner wall
37 gap
38 material tor mixing
39 turning direction
K coolant channel
$K_1$, $K_1'$ inlet channel
$K_2$, $K_2'$ return channel
L, L', L", L'", L"" hollow strip
R, R' rotational axis
S pivoting axis

We claim:

1. A mixer for thermal treatment of a material for mixing consisting of solid particles comprising:
    a mixing vessel for receiving the material for mixing mounted in a rack;
    the mixing vessel having a dual wall and at least one thermal medium channel that has a surface that at least partially contacts with the solid particles to be heat-treated;
    thermal treatment media are fed through the thermal medium channel when the mixer is in operation;
    a device for circulating the material for mixing situated in the mixing vessel, said device having a first axis of rotation along a longitudinal axis of the mixing vessel and a second axis of rotation transverse to the first axis of rotation;
    the mixing vessel is turnably supported in the rack about the first axis of rotation transversing two front sides of the vessel and with a motorized drive that is provided as a circulating device for turning the vessel;
    the mixing vessel being pivotably supported in the rack to allow the vessel to rotate around the second axis of rotation from a first filling position, to a mixing position where the first axis of rotation is substantially horizontal and then to second emptying position;
    wherein the vessel around its circumference has multiple thermal treatment channels;
    wherein the vessel has structures being hollow strips projecting inward in a radial direction for enlarging its inner surface;
    wherein the structures projecting inward are implemented as thermal medium channels;
    wherein each of the thermal medium channels has an inside for containing the thermal treatment media, which inside is not in fluid connection with an inside wall of the mixing vessel for receiving the material for mixing during a mixing procedure, such that thermal treatment media inside the thermal medium channels are kept separate from material for mixing inside the mixing vessel when the mixer is in operation;
    a thermal medium inlet line and a thermal medium drain line in fluid connection with the thermal medium channels; and
    the thermal medium inlet and the thermal medium drain line each in fluid connections with a feed through such that the thermal treatment media is circulated into and out of the thermal medium channels of the mixing vessel while the mixing vessel is rotating around the first axis of rotation.

2. Mixer according to claim 1, wherein the feed through is a rotary transmission feed through is coaxial with the longitudinal axis.

3. Mixer according to claim 1, wherein a filling opening and an emptying opening are the same opening.

4. Mixer according to claim 1, wherein the vessel is supported in the rack so as to rotate about its longitudinal axis and for its seating in the rack has available at least two guide rails that are open as they point outward in the radial direction and that have two side walls at a distance from each other, into which, distributed over the circumference, at least three bearing elements held on the rack side, such as rollers or wheels, engage, with at least one bearing element of such a bearing arrangement being driven as part of the circulation device and arranged to engage into it for transferring its drive motion to the guide rail for driving same.

5. Mixer according to claim 4, wherein as bearing elements rollers are provided with a cylindrical jacket surface and the distance of the side walls of the guide rails matches the width of the rollers that engage therein while allowing for a requisite play in the motion.

6. Mixer according to claim 4 wherein the mixer has multiple holding rollers or pairs of holding rollers which are on an outer side on at least one guide rail for holding the mixing vessel in the direction of its longitudinal axis.

7. Mixer according to claim 1, further comprising the vessel on at least one of its two front sides carries an attachment connecting piece for attaching the vessel to a material-for-mixing feed for feeding of material for mixing into the vessel to be cooled, and/or to a drain line for releasing the cooled material for mixing.

8. Mixer according to claim 7, wherein the attachment connecting piece is configured for detachable connection of same to the material-for-mixing feed and/or the drain line.

9. Mixer according to claim 8, wherein the attachment connecting piece is a part of a two-part coupling for connecting the attachment connecting piece to the material-for- mixing feed and/or the drain line, whereby the second part of such a coupling is assigned to the material-for-mixing feed or the drain line.

10. Mixer according to claim 9, wherein the two-part coupling can be pneumatically activated.

11. Mixer according to claim 1, wherein the multiple thermal treatment channels run parallel to the rotational axis of the vessel.

12. Mixer according to claim 11, wherein an entire inner wall of the mixing vessel is in contact with of one or more thermal medium channels.

13. Mixer according to claim 11, wherein the hollow strips with a plurality of attachment connecting pieces penetrating through an inner wall and an outer wall of the mixing vessel, and the attachment connecting pieces are not in direct liquid connection with a liquid access between the inner wall and the outer wall.

14. Mixer according to claim 11, wherein the hollow strips are inclined relative to a perpendicular to an inner wall of the mixing vessel, especially in the rotational direction of the mixing vessel.

15. Mixer according to claim 14, wherein the hollow strips are at a distance from the inner wall of the mixing vessel.

* * * * *